United States Patent [19]

Erickson

[11] Patent Number: 5,016,444
[45] Date of Patent: May 21, 1991

[54] ONE-AND-A-HALF EFFECT ABSORPTION CYCLE

[76] Inventor: Donald C. Erickson, 1704 S. Harbor La., Annapolis, Md. 21401

[21] Appl. No.: 448,260

[22] Filed: Dec. 11, 1989

[51] Int. Cl.$^5$ .............................................. F25B 7/00
[52] U.S. Cl. ...................... 62/79; 62/238.3; 62/476
[58] Field of Search .................... 62/476, 79, 238.3

[56] References Cited

U.S. PATENT DOCUMENTS

| | | | |
|---|---|---|---|
| 4,402,795 | 9/1983 | Erickson | 62/476 X |
| 4,439,999 | 4/1984 | Mori et al. | 62/476 X |
| 4,448,040 | 5/1984 | Kunugi | 62/476 X |
| 4,475,361 | 10/1984 | Alefeld | 62/476 |
| 4,542,629 | 9/1985 | Biermann | 62/476 |
| 4,551,991 | 11/1985 | Miyoshi et al. | 62/476 |
| 4,646,541 | 3/1987 | Reid, Jr. et al. | 62/476 |
| 4,732,008 | 3/1988 | DeVault | 62/476 X |
| 4,921,515 | 5/1990 | Dao | 62/476 X |

Primary Examiner—Lloyd L. King

[57] ABSTRACT

Apparatus and process are disclosed for a new absorption heat pump cycle which achieves a COP of approximately one and a half times that achievable in a single-effect cycle, at generator temperatures substantially less than the minimum required for double-effect operation. This is done by providing two internally heated generators (108 and 109 of FIG. 1) in addition to the externally-heated generator (110); plus at least two separate and distinct absorbent solution circulating loops (112–114 and 120–122); and a transfer of vapor from one of the generators (108) to one of the absorbers (116).

15 Claims, 4 Drawing Sheets

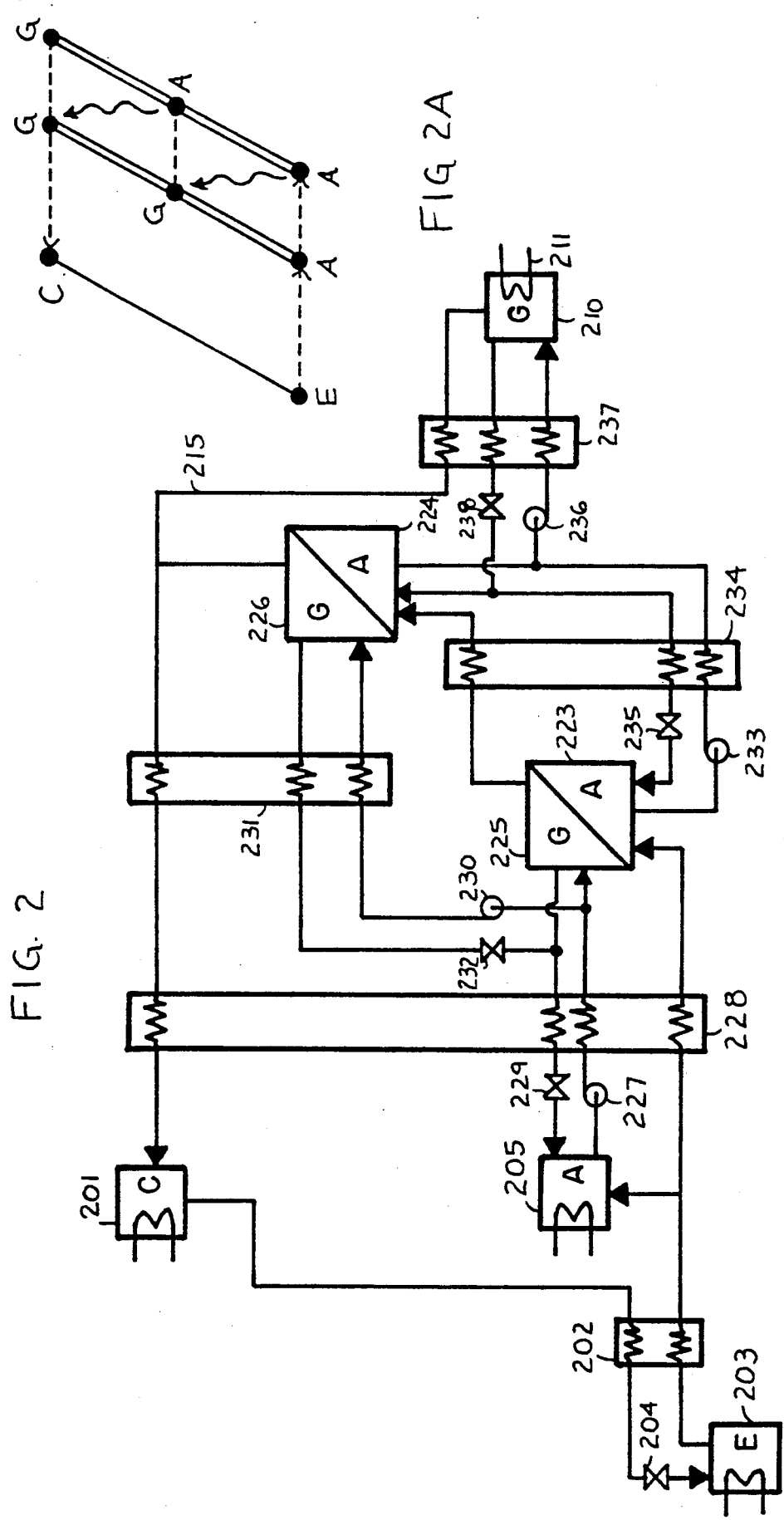

ONE-AND-A-HALF EFFECT ABSORPTION CYCLE

DESCRIPTION

1. Technical Field

This disclosure relates to absorption heat pumps wherein a condensable working fluid is successively absorbed into and desorbed out of a circulating absorbent solution. One net useful result thereby is an increase in temperature of a quantity of heat. The disclosed improvement is applicable to all known types and applications heat-activated of absorption heat pumping: refrigeration cycles, space conditioning cycles, industrial heating cycles; continuous and intermittent cycles; closed and open cycles; and all types of hybrid cycles; and also to all known absorption working pairs, including those with either volatile or nonvolatile absorbents.

2. Background

Increasing the efficiency or Coefficient of Performance (COP) of absorption cycles is a continuously sought after goal. At present it is critically important to help decrease global fuel consumption. Many standard and well-known measures are routinely applied to single effect absorption cycles to maximize their COP, such as various sensible heat recoveries. Nevertheless the "cooling" COP (defined as quantity of heat "lifted" divided by quantity of heat "dropped", or equivalently as evaporator heat duty divided by generator heat duty) is thermodynamically constrained to no more than about 0.75 in practice.

In order to overcome this limitation, numerous multi-effect or multiple-stage cycles have been proposed. The "N-effect" terminology is analogous to its use in evaporators, where it signifies that the source heat causes N separate evaporations as it thermally cascades through the apparatus.

Double-effect absorption cycles are achieved by either cascading pressure levels or absorbent concentrations. A pressure-staged double-effect cycle is described in U.S. Pat. Nos. 4,646,541 and 4,183,228, and concentration-staged in U.S. Pat. No. 4,531,374. Double effect cycle COPs range from 1.1 to 1.3.

Triple effect cycles can be staged on pressure alone, concentration alone, or combination pressure and concentration. Examples of three or more effects are found in U.S. Pat. Nos. 3,742,728, 3,831,397, 4,520,634 and 4,732,008.

Another variant of interest is the "one-half effect" cycle, which usually has some other name applied. See for example U.S. Pat. Nos. 4,337,625 and 4,028,078.

Many additional cycle variants are illustrated in U.S. Pat. Nos. 4,770,005 and 4,531,374.

Just as in the evaporator art, the more effects present, the more efficient the cycle (although the benefit rapidly diminishes with increasing effects). Unfortunately, however, there are severe constraints on how may effects are feasible. These are dictated by solubility limits and temperature limits (decomposition, corrosion, etc.) of the absorption working pair, and also by the available heat source temperature. In order to accomplish a "lift" of a quantity of heat in a single effect absorption cycle, there must be a somewhat larger "drop" of a somewhat larger quantity of heat. For every added effect, an additional drop must be present.

The air conditioning application of absorption cycles requires an unusually low lift, e.g., from 4° C. to 40° C., and hence double-effect and even triple-effect cycles are possible. Most other applications of interest entail much higher lifts, e.g., 60° to 100° C. lifts. Frequently not even a double-effect cycle is possible at those lifts.

The "generator-absorber heat exchange" cycle (GAX cycle), as disclosed in U.S. Pat. No. 4,846,240, does not provide any substantive benefit over a properly designed single effect cycle until double-effect generator temperature is reached. Above that temperature, the double-effect cycle has a markedly higher COP. Accordingly, in many heat pumping situations of interest, wherein the available "drop" is not sufficient to support a double-effect cycle, the above disclosed multi-effect cycles are not feasible, and the cycle COP is limited to the single effect value even though the available drop may be substantially more than the single effect minimum.

What is needed, and included among the objects of this invention, is an apparatus and corresponding process for heat pumping according to the absorption principle which enables attainment of cycle COPs substantially higher than the single-effect COP when the available or allowable generator temperature is less than what is required for double-effect operation.

DISCLOSURE OF INVENTION

The above and other useful objects are attained through provision of "one and a half effect" absorption cycle, i.e., one in which the prime (externally supplied) heat generates one full quota of desorbed vapor (for eventual condensation and evaporation), and then an additional half-quota. Thus the attainable cycle COP is about half-again the single-effect COP, i.e., about 1.0, and the minimum required generator temperature is about halfway between the minimum single effect temperature and the minimum double-effect temperature.

The cycle components necessary to achieve 1½ effects comprise:

an externally-heated high-temperature generator;

two internally-heated generators, both at lower temperature than the high temperature generator, and at least one at a lower pressure than the high temperature generator, and wherein the internal heating is a least partly by latent heat exchange;

at least two absorbers, each operatively connected by an absorbent circulating pump and absorbent sensible heat exchanger directly to at least one of said generators; and a conduit for routing at least part of the vapor desorbed from at least one of said generators to at least one of said absorbers.

A key aspect of the invention is that there are at least two separate absorbent circulation loops. It is possible to use completely different absorbents in the respective loops, provided they use the same working fluid, as there is no need for the respective absorbent solutions to ever contact or mix. For example, one could be aqueous LiBr, and the other an aqueous mixture of KOH and CsOH. Usually, however, it is more practical to use the same absorbent in both loops, but at different concentrations.

Within the above generic definition, there are at least four 1½-effect cycles possible, dependent upon whether pressure staging or concentration staging is used, and upon which internal latent heat exchanges are used.

With concentration staging, the externally-heated generator is at the pressure of the externally-cooled condenser, which is the highest cycle pressure, and at an absorbent concentration higher than the concentration of the absorbent in the externally-cooled absorber which receives vapor from the evaporator. Higher concentration signifies less working fluid content, and is alternatively described as "stronger" or "richer" absorbent. In that embodiment, the invention is generically described as being comprised of the following common novel characteristics:

an externally-heated generator;

a second generator which is connected to a vapor conduit which is also connected to said externally-heated generator, and which is heated by latent heat exchange with an absorber;

a first absorbent solution circulation loop comprised of a pump and sensible heat exchanger which circulates a first absorbent solution between said absorber and said externally-heated generator;

a second absorber which is externally cooled;

a second absorbent solution circulation loop comprised of a second pump and second sensible heat exchanger which circulates a second absorbent solution between said second absorber and said second generator; and a third generator which is connected by a vapor conduit to at least one of said absorber and said second absorber.

With pressure staging, the externally-heated generator is at approximately the same solution concentration as the externally-cooled absorber which receives vapor from the evaporator, but at a higher pressure than the externally-cooled condenser. Also, the externally-heated generator shares the same absorbent solution circulation loop with the externally-cooled absorber. In the pressure-staged embodiment, the invention is generically described as comprised of:

an externally-heated generator;

a condenser communicating with the externally-heated generator by a vapor conduit;

a second generator which is heated by latent heat exchange with said condenser;

a second condenser which is externally cooled and which communicates with said second generator by a second vapor conduit; and an absorber for said second generator which is in communication with a generator by a vapor conduit.

One advantage of all four embodiments of the 1½-effect cycle is that they all have at least one latent-heat-exchanged generator which operates at a substantially lower temperature than the generator temperature of a corresponding single-effect cycle. Therefore, when the externally-heated generator is heated by a hot combustion gas, the low-temperature generator can be fitted with an auxiliary heating surface to extract more energy from the combustion gas, i.e., cool the combustion gas to a lower temperature than is possible with a conventional single-effect cycle. This further increases the 1½-effect COP over the single-effect COP.

In regard to the concentration-staged 1½-effect cycles, there is one other advanced cycle which exhibits certain similarities. That is the "variable-effect" cycle, as described in U.S. Pat. Nos. 4,442,677 and 4,542,629. The similarities are that that cycle also has an externally-heated generator at the pressure of the externally-cooled condenser, and two other generators which are heated by latent-heat-exchange with internal heat pump fluids, and two pumps, and an internal transfer of vapor from one of the latent-heat exchanged generators to an absorber at an intermediate pressure. The differences from the present disclosure are that the variable-effect cycle circulates a single absorbent solution sequentially through all three generators and three absorbers, which accordingly necessarily entail overlapping concentration ranges of a single absorbent, whereas the 1½-effect cycle circulates at least two completely separate and non-overlapping absorbent solutions, which have at most incidental and minor liquid phase communication with one another.

BRIEF DESCRIPTION OF THE DRAWINGS

The four figures are simplified schematic flowsheets of the four basic embodiments of the 1½-effect cycle. FIG. 2 is the concentration-staged embodiment wherein the absorber receiving intermediate-pressure vapor supplies latent heat to one of the high-pressure generators, and hence only two solution concentrations and two pumps are necessary.

FIGS. 1A, 2A, 3A, and 4A illustrate the thermodynamic relationships of each corresponding cycle: pressure, temperature, concentration, vapor transfer, and heat transfer.

BEST MODE FOR CARRYING OUT THE INVENTION

Figure 1:
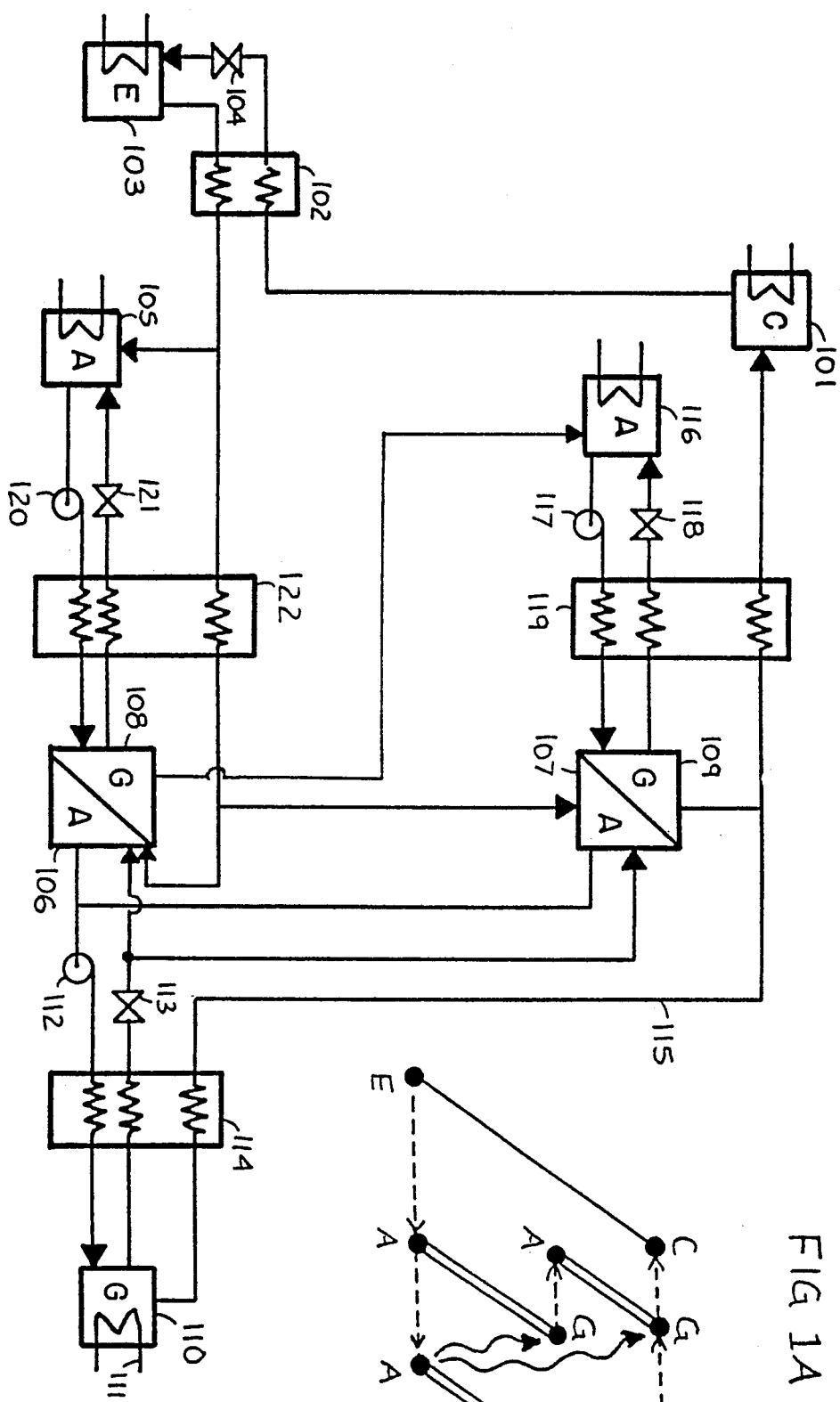
FIG. 1 is the concentration-staged embodiment wherein the absorber receiving intermediate pressure vapor is externally cooled, and hence there are three separate absorbent circulating loops at three different concentrations.

Referring to FIG. 1, externally-cooled condenser 101 sets the high pressure of the cycle, and delivers liquid condensate after subcooling in sensible heat exchanger 102 to low-pressure evaporator 103 which supplies cooling to an external fluid. The condensate is let down to evaporator pressure by means for pressure reduction 104. After evaporation, part of the vapor is routed to externally-cooled absorber 105, and the remainder to absorbers 106 and 107. Those two absorbers share the same absorbent solution and vapor stream. They are illustrated as separate components since they are used to heat different generators, 108 and 109 respectively. The diagonal line signifies latent heat exchange surface. Thus absorbers 106 and 107 are in effect two parts of the same absorber, and indeed could be combined into a single vessel if needed. They are connected by a closed loop of circulating absorbent solution to generator 110, which includes heating surface 111 for heating by an external fluid. The absorbent solution circulation loop is comprised of the standard elements: pump 112, pressure letdown valve 113, sensible heat exchanger 114, and the necessary interconnecting piping. Vapor generated in generator 110 is routed to condenser 101 via conduit 115, and is joined by vapor from generator 109. Generator 109 is connected by a closed loop of circulating absorbent solution to externally cooled absorber 116, said loop including pump 117, letdown valve 118, and sensible heat exchanger 119. Absorber 116 receives intermediate-pressure vapor from generator 108, and that generator is connected by a closed loop of circulating absorbent solution to absorber 105, said loop comprised of pump 120, letdown valve 121, and sensible heat exchanger 122.

Figure 1A:
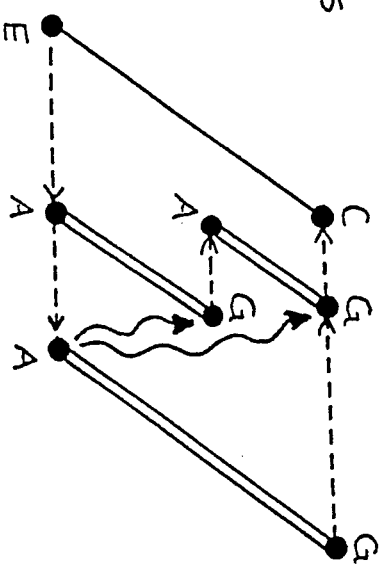

FIG. 1A illustrates the cycle thermodynamics according to the standard conventions that horizontal lines are constant pressure, vertical lines are constant temperature, and diagonal lines are constant concentration of the absorbent solution. In addition, dashed lines signify vapor transport, solid lines signify liquid, double solid lines signify circulating absorbent solution, and wavy lines signify internal latent heat transfer. Thus it can be seen that this cycle involves three different solution concentrations and hence requires three pumps.

Referring to FIG. 2, components 201-205, 210-211, and 215 have the same description as corresponding 100-series components of FIG. 1. In this embodiment, generator 210 regenerates the absorbent solution from two different absorbers, 223 and 224, operating at different pressures. Absorber 223 receives low-pressure vapor from evaporator 203, and supplies latent heat to generator 225. Intermediate pressure vapor from generator 225 is supplied to absorber 224, which in turn supplies latent heat to generator 226. High pressure vapor from generator 226 is joined with that from generator 210 for routing to condenser 201. Absorber 205 absorbent solution is regenerated by both generator 225 and generator 226. Pump 227, sensible heat exchanger 228, and letdown valve 229 completes the loop to intermediate-pressure generator 225; and pump 230, sensible heat exchanger 231, and letdown valve 232 complete the loop to generator 226. Note that the two generators are shown in "parallel" configuration regarding absorbent flow from absorber 205, but as is known in the art they could alternatively be configured in series flow. The latter requires more pumping power, but has the advantage that only a single pump is required.

In an analogous fashion, both absorbers 223 and 224 are regenerated by generator 210: the former by pump 233, sensible heat exchanger 234, and letdown valve 235; and the latter by pump 236, sensible heat exchanger 237, and letdown valve 238. Once again, a series-flow arrangement could be substituted for the depicted parallel flow.

FIG. 2A illustrates the cycle, showing that only two separate absorbent concentrations are involved, at three pressure levels.

Figure 3:
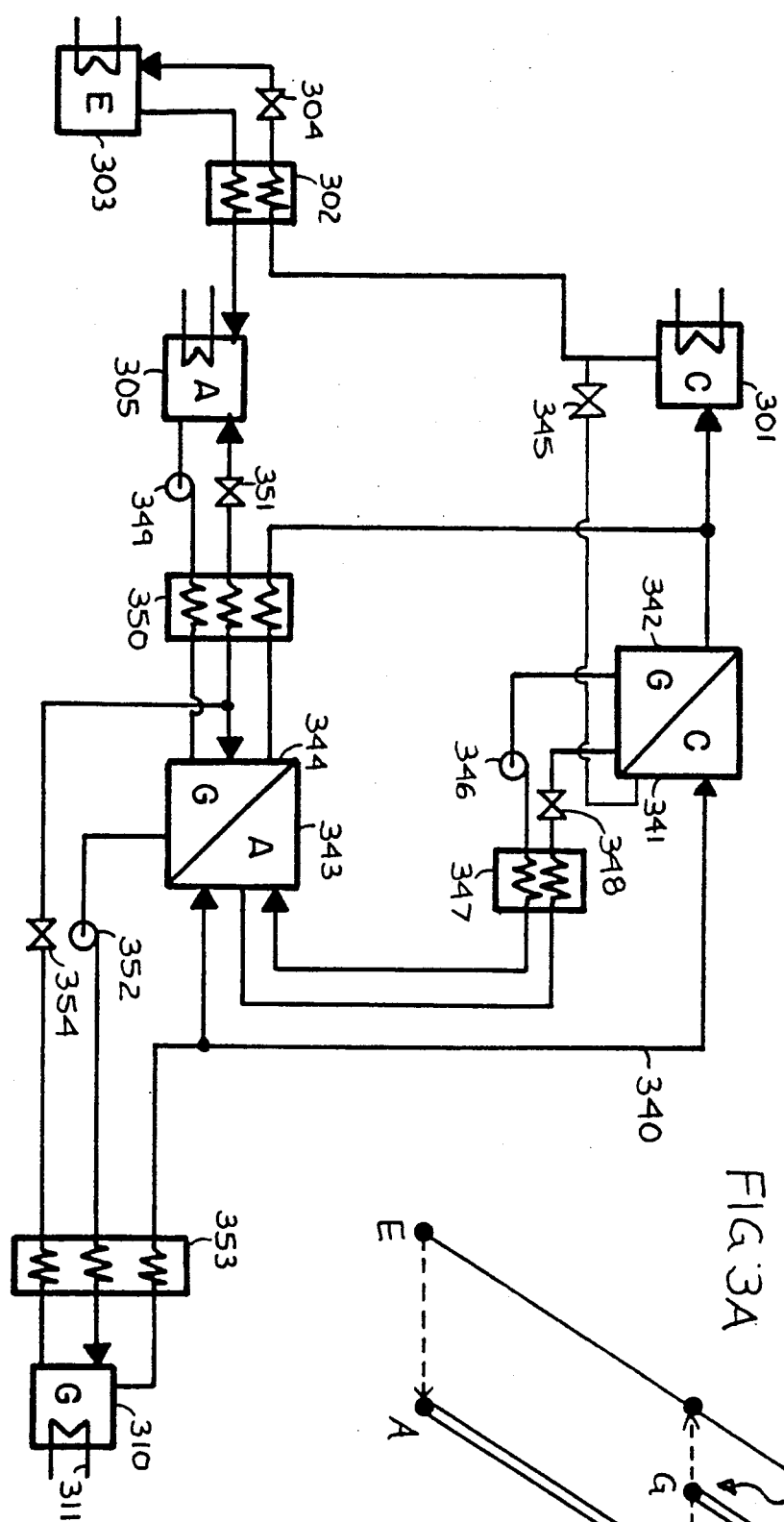
FIG. 3 is the pressure-staged embodiment wherein the absorber in circulating absorbent communication with the lower-concentration generator is at a higher pressure than its associated generator, and thus at the same pressure as the externally-heated generator.

Referring to FIG. 3, components 301-305, and 310-311 are similar in function to the corresponding 100-series components. Vapor desorbed from generator 310 is partly routed via conduit 340 to condenser 341, which is at higher pressure than externally-cooled condenser 301, and which supplies latent heat to generator 342. The remainder of the vapor from generator 310 is supplied to absorber 343, which in turn supplies latent heat to generator 344. Both generators 342 and 344 are at the same pressure, albeit at different temperatures and concentrations, and they both discharge desorbed vapor to condenser 301. Condensate from condenser 341 is letdown in pressure by valve 345 and joined with condensate from condenser 301.

Absorbent solution is circulated between absorber 343 and generator 342 by pump 346, sensible heat exchanger 347, and letdown valve 348. Absorbent solution in absorber 305 is regenerated by both generators 344 and 310, the former via pump 349, sensible heat exchanger 350, and letdown valve 351; and the latter by pump 352, sensible heat exchanger 353, and letdown valve 354.

Figure 3A:
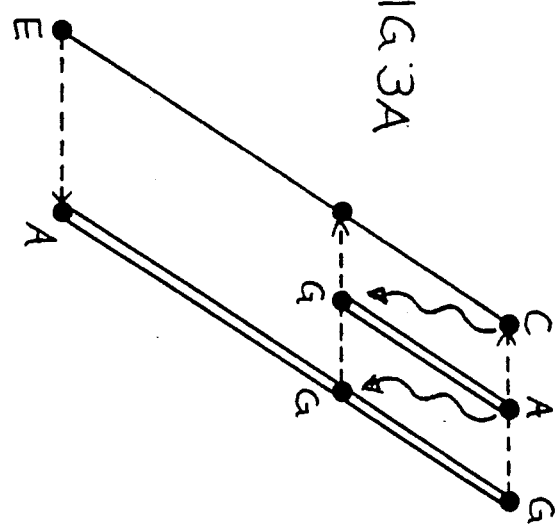

FIG. 3A illustrates that two of the three absorbent circulation loops are at pressures above the externally-cooled condenser pressure; and also that the three loops entail only two separate and distinct absorbent concentrations, and hence could be effected with only two pumps.

Figure 4:
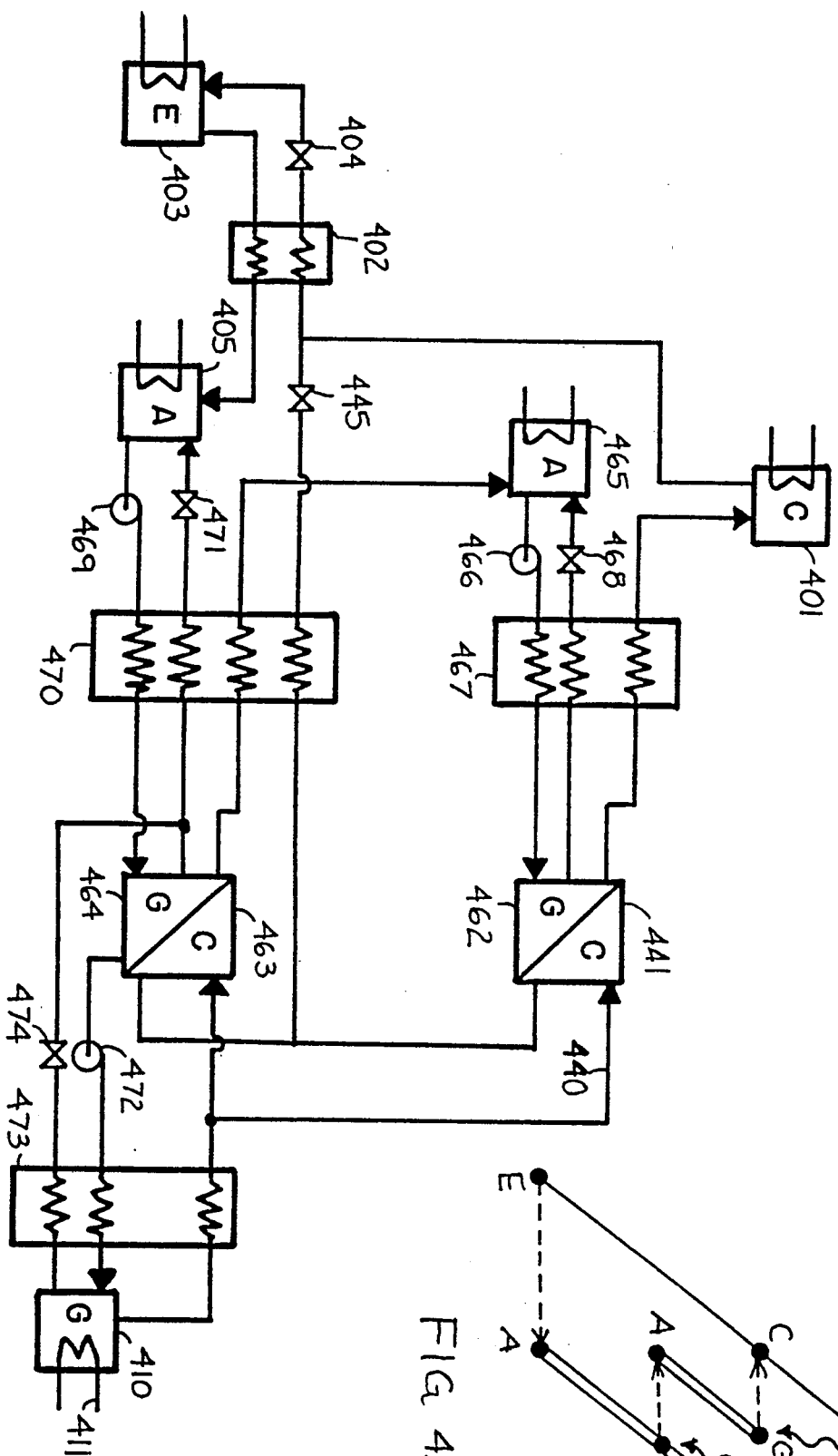
FIG. 4 is the pressure-staged embodiment wherein that absorber is at a lower pressure than its associated generator, and hence is at the same pressure as the remaining latent-heat-exchanged generator.

Referring to FIG. 4, components 401-405, 410, 411, 440, 441, and 445 function similarly to the corresponding 300-series components of FIG. 3. Vapor desorbed from generator 410 is condensed to supply latent heat to two different generators—462 and 464—which are at different concentrations and pressures. Thus condenser 463 can be regarded as the other half of condenser 441. Vapor from generator 462 is condensed in condenser 401, and vapor from generator 464 is absorbed in absorber 465, which is externally cooled. Absorbent solution is circulated between absorber 465 and generator 462 by pump 466, sensible heat exchanger 467, and letdown valve 468. Absorber 405 absorbent is regenerated by both generator 464 and generator 410, the former via pump 469, sensible heat exchanger 470 and letdown valve 471; the latter by pump 472, sensible heat exchanger 473, and letdown valve 474.

Figure 4A:
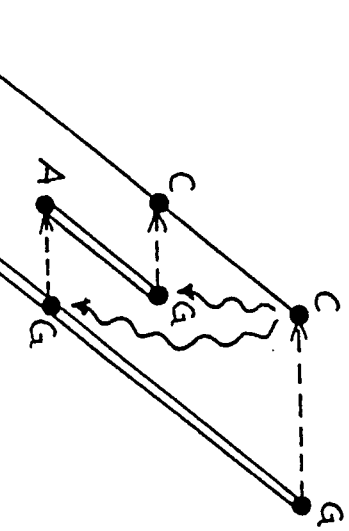

FIG. 4A illustrates the unique aspects of this particular 1½-effect embodiment: vapor is transferred at four different pressures; two of the three absorbent circulation loops are below condenser pressure; and the low concentration absorber is below its associated generator's pressure.

In overview, comparison of the four embodiments reveals that three of them (FIGS. 1, 2, and 4) transfer vapor from a generator to an absorber at a pressure intermediate to the evaporator pressure and the externally-cooled condenser pressure, whereas the fourth (FIG. 3) transfers vapor from a generator to an absorber at a pressure above the externally-cooled condenser pressure. The source of the internal latent heat is a single absorber in FIG. 1; two separate (different pressure) absorbers in FIG. 2; an absorber and a condenser in FIG. 3; and a single condenser in FIG. 4. In addition to the evaporator pressure level, FIGS. 1, 2, and 3 have two additional pressure levels, whereas FIG. 4 has three additional.

In all figures the low temperature heat being "lifted" or "pumped" is input at the evaporator, and the high temperature heat being "dropped" is input at the externally-heated generator; the combined heat inputs are extracted from the several externally-cooled components. Thus it can be seen that the many possible variations permit wide latitude in matching the specific needs of any particular application.

In the "open cycle" mode either the evaporator or the externally cooled condenser or both would be deleted from the flowsheet.

Obviously many additional components may be present. For example, when using an absorption working pair in the cycle which includes a volatile absorbent, it may be desirable to include a rectifier in any vapor stream routed to a colder component, and/or an enrichment column in any vapor stream routed to a hotter component.

I claim:

1. A process for raising the temperature of a supply of heat to a higher temperature comprising:

a. boiling a liquid with said heat to form a low pressure vapor;

b. absorbing part of said low pressure vapor in an absorbent solution which is at a first concentration and which is at said higher temperature;
c. supplying said liquid by condensing a vapor at approximately said higher temperature and at a first pressure;
d. desorbing a vapor at said first pressure by supplying high temperature heat to an absorbent solution which is at said first pressure and which is above said first concentration;
e. supplying a second vapor at said first pressure by heating a second absorbent solution which is at a concentration no higher than said first concentration; and
f. desorbing at a second pressure at least part of the solution from said absorbing step by heating it with at least part of the solution from said high temperature desorbing step, which is absorbing the remainder of said low pressure vapor.

2. The process according to claim 1 wherein said second vapor desorbing step is at a concentration lower than said first concentration, and wherein it is also heated by solution from said high temperature absorbing step which is absorbing part of said low pressure vapor, and additionally comprising absorbing said second pressure vapor in said second absorbent solution.

3. The process according to claim 1 additionally comprising supplying said heat to said second absorbent solution by absorbing the vapor from said second pressure desorption in a remaining part of the solution from said high temperature desorbing step.

4. A heat-activated absorption heat pump apparatus comprised of:
a. three generators, one adapted for externally heating, and the remaining two adapted for heating by latent heat exchange (LHX) from internal heat pump fluids;
b. two absorbers, each operatively connected directly to at least one of said generators by a separate absorbent circulation loop comprised of a pump and a sensible heat exchanger, and at least one of said absorbers adapted for external cooling;
c. a first vapor conduit connecting one of said generators to one of said absorbers;
d. a first liquid conduit for supplying absorbent to said externally heated generator from one of said absorbers; and
e. a second liquid conduit for supplying said separate abosrbent from one of said LHX generators to said externally cooled absorber.

5. The apparatus according to claim 4 additionally comprised of: one condenser adapted to receive vapor from at least one of said generators, and also adapted for external cooling.

6. The apparatus according to claim 5, additionally comprised of an evaporator which is adapted for external heating by a fluid to be cooled which is connected by liquid conduit to said externally cooled condenser, and which is connected by a second vapor conduit to one of said absorbers which is externally cooled.

7. The apparatus according to claim 6 additionally comprised of an additional absorber which is also connected to said second vapor conduit, and which is in LHX relationship with said LHX generator which is connected to said first vapor conduit.

8. The apparatus according to claim 7, wherein said additional absorber is also in LHX relationship with said remaining LHX generator.

9. The apparatus according to claim 7, wherein said absorber connected to said first vapor conduit is in LHX relationship with said remaining LHX generator.

10. An absorption heat pump apparatus comprised of:
a. an externally-heated generator; p1 b. a second generator which is connected to a first vapor conduit which is also connected to said externally-heated generator, and which is heated by latent heat exchange with an absorber;
c. a first absorbent solution circulation loop comprised of a pump and a sensible heat exchanger which circulates a first absorbent solution between said absorber and said externally-heated generator;
d. a second absorber which is externally cooled;
e. a second absorbent solution circulation loop comprised of a second pump and second sensible heat exchanger which circulates a second absorbent solution between said second absorber and said second generator; and
f. a third generator which is connected by a second vapor conduit to at least one of said absorber and said second absorber.

11. Apparatus according to claim 10 wherein said second vapor conduit connects only to said absorber, and additionally comprised of a third absorber which is in latent-heat-exchange relationship with said third generator and which is in vapor communication with said externally-cooled absorber.

12. Apparatus according to claim 10 wherein said second vapor conduit connects only to said second absorber, and additionally comprised of a third absorbent solution circulation loop which circulates absorbent between said third generator and a third absorber which is externally cooled and which is in vapor communication with said absorber.

13. An absorption heat pump apparatus comprised of:
a. an externally-heated generator;
b. a condenser communicating with the externally-heated generator by a vapor conduit;
c. a second generator which is heated by latent heat exchange with said condenser;
d. a second condenser which is externally cooled and which communicates with said second generator by a second vapor conduit; and
e. an absorber which is in communication with said second generator by an absorbent solution circulation loop and which is in communication with a generator by a third vapor conduit.

14. The apparatus according to claim 13 wherein said generator is said externally-heated generator, and additionally comprised of:
a. a third generator which is in latent heat exchange relationship with said absorber; and
b. a second absorber which is externally cooled and which is connected to both said third generator and said externally-heated generator by at least one absorbent solution circulating loop.

15. The apparatus according to claim 13 wherein said generator is also heated by latent heat exchange with said condenser, and wherein said absorber is externally cooled, and additionally comprised of:
a. a second absorber which is also externally cooled; and
b. at least one absorbent solution circulation loop which connects said second absorber to said generator and to said externally-heated generator.

* * * * *